United States Patent
Suzuki et al.

(10) Patent No.: US 6,429,284 B2
(45) Date of Patent: Aug. 6, 2002

(54) METHOD FOR TREATING FLAME RETARDANT RESIN COMPOSITION

(75) Inventors: Masaaki Suzuki, Osaka; Keizo Nakajima, Kawachinagano; Hiroshi Onishi, Hirakata, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/858,681

(22) Filed: May 16, 2001

(30) Foreign Application Priority Data

May 18, 2000 (JP) ........................................ 2000-146539
May 18, 2000 (JP) ........................................ 2000-146541

(51) Int. Cl.$^7$ .............................. C08F 6/06; C08F 6/28; C08J 3/00; C08J 3/11; C08J 9/04
(52) U.S. Cl. .......................... 528/481; 521/40; 521/97; 528/480; 528/483; 528/490; 528/503
(58) Field of Search ..................... 521/40, 97; 528/490, 528/483, 480, 481, 503

(56) References Cited

U.S. PATENT DOCUMENTS

| | | | | |
|---|---|---|---|---|
| 4,902,780 A | * | 2/1990 | Bourrain et al. ............. | 528/483 |
| 5,530,049 A | * | 6/1996 | Dee et al. .................... | 524/424 |
| 5,696,195 A | * | 12/1997 | Tuminello et al. .......... | 524/419 |
| 5,756,657 A | * | 5/1998 | Sawan et al. ................ | 528/487 |
| 5,861,473 A | * | 1/1999 | DeCrosta et al. ............ | 528/490 |

FOREIGN PATENT DOCUMENTS

| | | |
|---|---|---|
| JP | 11-116729 A | 4/1999 |
| JP | 11-140223 A | 5/1999 |
| JP | 11-156378 A | 6/1999 |
| JP | 11-228731 A | 8/1999 |

* cited by examiner

*Primary Examiner*—Rabon Sergent
(74) *Attorney, Agent, or Firm*—Akin, Gump, Strauss, Hauer & Feld, L.L.P.

(57) ABSTRACT

For efficiently recycling a flame retardant resin composition constituted of a flame retardant and a resin, the present invention provides a method for treating a flame retardant resin composition comprising a step of bringing at least part of a flame retardant resin composition containing a resin and a flame retardant into contact with a pressurized fluid constituted of a solvent to reduce the flame retardancy.

6 Claims, 6 Drawing Sheets

METHOD FOR TREATING FLAME RETARDANT RESIN COMPOSITION

BACKGROUND OF THE INVENTION

The present invention relates to a technique for enabling a flame retardant-containing resin composition to be recycled, and to a method for treating a resin composition by removing the flame retardant component to make it easier to reuse the resin.

Particularly, the present invention relates to a method for treating resin compositions containing a halogen-containing flame retardant, which are used as materials of the housings of, e.g., the monitors of televisions and computers, whereby their flame retardant components are removed therefrom and it becomes easier to reuse the resulting resins.

In recent years, there has been a desire for an effective utilization of resources, and techniques for recycling a variety of materials have been under development. Since resin materials such as plastics are generally disposed by incineration or land filling, it can be said that it is important to recycle waste generated during the production process of products and after their use. A variety of recycling techniques have been investigated from every possible aspect, example of which are thermal recycling in which resins are incinerated to provide fuels or combustion heat generated thereby is effectively utilized; chemical recycling in which resins are liquefied or gasified to provide starting material or fuels; other chemical recycling in which resins are decomposed to be recycled as oligomers or monomers which are starting materials of the resins; and materials recycling in which resins are pelletized as they are and reused. Ease of treatment and the quality of the resulting starting materials and fuels are important in these recycling techniques.

Generally, from the view point of safety, resins that are used for housings and substrates of household electric appliances are rendered flame retardant through incorporation of a flame retardant. For example, as materials of the housings for monitors of computers and video recorders, thermoplastic resins such as styrenic resin, ABS (acrylonitrile-butadiene-styrene) resin, high-impact polystyrene resin (blend of polybutadiene and polystyrene) with improved impact resistance are currently in general use.

However, thermoplastic resin themselves have the drawback of being highly combustible. Therefore, from the view point of prevention of the spread of flame in case of fire, flame retardant resin compositions which are rendered flame retardant by adding flame retardancy-imparting agents such as flame retardants or flame retardant auxiliaries to resins are in wide use. Of these, halogen-containing flame retardants are in global use, because they have the effect of imparting high flame retardancy to a variety of thermoplastic resins and are cheap.

When recycling these flame retardant resin compositions, there arise the problems that the presence of the flame retardant component makes the treatment of obtaining starting materials and fuels difficult and that the quality of the recycled product will be lowered as a result of mingling of the flame retardant component or the decomposed product. Therefore, particularly, almost no attempt to treat or recycle flame retardant-containing resin compositions has been made, presenting a serious problem.

Thus, for example, as a method of recycling a flame retardant resin composition, a method of thermally decomposing the resin with the flame retardant contained therein by thermal or chemical recycling has been investigated. Japanese Unexamined Patent Publication No. Hei 11-140223 discloses a method in which a plastic resin such as polyvinyl chloride is heated to eliminate the halogen component therefrom and then decomposed. Japanese Unexamined Patent Publication No. Hei 11-228731 discloses a method in which the resin is decomposed together with the flame retardant contained therein.

Moreover, in the case where a halogen-containing flame retardant is employed as the flame retardant, the halogen component contained therein is eliminated upon thermal decomposition in thermal or chemical recycling, resulting in the emission of a halogen gas or a halogen-containing compound such as halogenated hydrogen. Incineration of such flame retardant-containing resin has the possibility of generation of a hazardous halogen-containing compound such as dioxin. These halogen-containing compounds facilitate the corrosion of equipment for treatment or require sufficient equipment for preventing such hazardous halogen-containing compounds to be released to the air.

Moreover, in order to prevent the corrosion of a container, for the case where plastics such as polyvinyl chloride and polyvinylidene chloride are decomposed, dehalogenation of the plastics in advance has been proposed. For example, Japanese Unexamined Patent Publication No. Hei 11-116729 discloses a method in which a plastic is heat-treated in an organic solvent thereby to dehydrochlorinate the plastic and remove an obtained hydrochloride together with low-boiling point components obtained through the decomposition of the plastic. Moreover, disclosed in Japanese Unexamined Patent Publication No. Hei 11-140223 is a method in which the halogen atoms eliminated by the heating of a plastic are recovered and the resulting plastic is decomposed with the u s e of a supercritical fluid. Japanese Unexamined Patent Publication No. Hei 11-156378 disclose s a method in which, when a hazardous halogen-containing compound such as dioxin generated upon incineration of plastics is decomposed through supercritical hydration, halogens are neutralized by being mixed with a neutralizing agent.

As of now, for treating flame retardant resin compositions thereby to recycle them, many methods to chemically recycle resins through decomposition have been proposed, but not so many proposals have been made to materially recycle them. Since a reduction of energy required to recycle flame retardant resin compositions can be realized through material recycling, the technological development is important. For example, decomposition of resins through chemical recycling to provide their starting materials further requires energy for synthesizing resins, but it is highly possible that material recycling of them makes such application of energy unnecessary.

Moreover, conventional methods for treating halogen-containing resin compositions involve heat treatment for eliminating halogens, and the application of heat results in decoloration of the resins themselves, a decrease in molecular weight, or degradation due to crosslinking. Therefore, although the resins treated in such manner are suitable for use in chemical recycling through decomposition, from the view point of quality, they are not suitable for use in material recycling where the recycled products are reused as resins. That is, chemical recycling in which resins undergo thermal decomposition does not have such problem, but technological development to provide recycled products with improved quality is required for material recycling.

In view of such problems as have been faced in the prior art, an object of the present invention is to provide a method for eliminating the flame retardancy, which prevents an effective reuse of a flame retardant resin composition comprising a flame retardant and a resin. In other words, an object of the present invention is to provide a method for treating a flame retardant resin composition in which a flame retardant component(s) is removed from the flame retardant resin composition to leave a favorably reusable resin free from degradation by heat.

Another object of the present invention is to provide a treatment method, which makes it possible to remove a flame retardant component from a flame retardant-containing resin composition without degradation of a recycled resin due to heat treatment and facilitates reprocessing of the recycled resin. Particularly, the present invention provides a method capable of being smoothly performed in combination with a series of steps of pelletizing and powdering a thermoplastic resin.

BRIEF SUMMARY OF THE INVENTION

The present invention relates to a method for treating a flame retardant resin composition comprising a step of bringing at least part of a flame retardant resin composition containing a resin and a flame retardant into contact with a pressurized fluid constituted of a solvent thereby to reduce flame retardancy of the flame retardant resin composition.

In concrete, this method can be performed mainly in two manners as described below.

In the first embodiment of the method, the flame retardancy of the above-mentioned flame retardant resin composition is reduced through extraction of the flame retardant therefrom by bringing at least part of the flame retardant resin composition into contact with the pressurized fluid.

In this case, it is effective that the method comprises a step of foaming the flame retardant resin composition by the use of the solvent constituting the above-described pressurized fluid after the extraction of the flame retardant.

In the second embodiment of the method of the present invention, a halogen-containing flame retardant is employed as the flame retardant and the flame retardancy of the flame retardant resin composition is reduced through dehalogenation by bringing at least part of the flame retardant resin composition into contact with the pressurized fluid.

In this case, it is effective that the method further comprises a step of reducing the flame retardant resin composition with the solvent constituting the above-mentioned pressurized fluid after the dehalogenation.

Further, it is also effective that the method comprises a step of foaming the above-described flame retardant resin composition with the solvent constituting the above-mentioned pressurized fluid after the dehalogenation.

In the method for treating a flame retardant resin composition of the present invention, it is effective that the solvent is carbon dioxide.

Particularly in the first embodiment of the method of the present invention, it is effective that the pressurized fluid described above contains an auxiliary solvent.

It is also effective that the pressure of the pressurized fluid is not lower than the critical pressure of the solvent constituting the pressurized fluid and not higher than three times the critical pressure.

It is also effective that the pressure of the pressurized fluid is not lower than half the critical pressure of the solvent constituting the pressurized fluid and lower that the critical pressure.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

First Embodiment

In first, there will be described the first embodiment of the method for treating a flame retardant resin composition of the present invention comprising a step of bringing at least part of a flame retardant resin composition containing a resin and a flame retardant into contact with a (highly) pressurized fluid constituted of a solvent to reduce flame retardancy of the flame retardant resin composition.

In the first embodiment of the method for treating a flame retardant resin composition, the flame retardant component is removed from the flame retardant containing resin composition for achieving the above-mentioned objects, by extracting the flame retardant from the resin composition with the use of the pressurized fluid.

Moreover, for achieving the objects mentioned above, in the first embodiment of the method for treating a flame retardant resin composition by removing the flame retardant component from the flame retardant resin composition, the resin is a thermoplastic resin and the resin composition is foamed by the solvent constituting the pressurized fluid after the flame retardant is extracted from the resin composition using the pressurized fluid. It is noted that the resin composition, from which the flame retardant is extracted, is substantially composed only of the resin and additives rather than the flame retardant, if any.

As the flame retardant to which the present invention is applicable, an addition-type halogen-containing flame retardant is preferred.

In the present invention, it is suitable that the pressure of the pressurized fluid is within the range of from the critical pressure of the solvent constituting the above-mentioned pressurized fluid to three times the critical pressure.

Moreover, in the present invention, it is suitable that a solvent for use in the pressurized fluid is carbon dioxide.

Furthermore, in the present invention, the pressurized fluid effectively contains not less than 1 mol % and less than 20 mol % of an auxiliary solvent enables excellent effects to be obtained.

Hereinafter, the first embodiment of the treatment method of the present invention will be described in concrete.

According to the present invention, by removing a flame retardant component from a flame retardant resin composition, a recycled resin can be obtained without deterioration or degradation due to heat. Further, since the flame retardant extracted and separated as the flame retardant component can be recovered without degradation, it can be reused. Particularly, in the case where the resin component of a flame retardant resin composition is a thermoplastic resin, the resin can be pelletized or powdered with ease at the time of the reuse thereof.

The reason why these effects can be obtained will be explained with reference to FIGS. 1 to 3.

Figure 1:
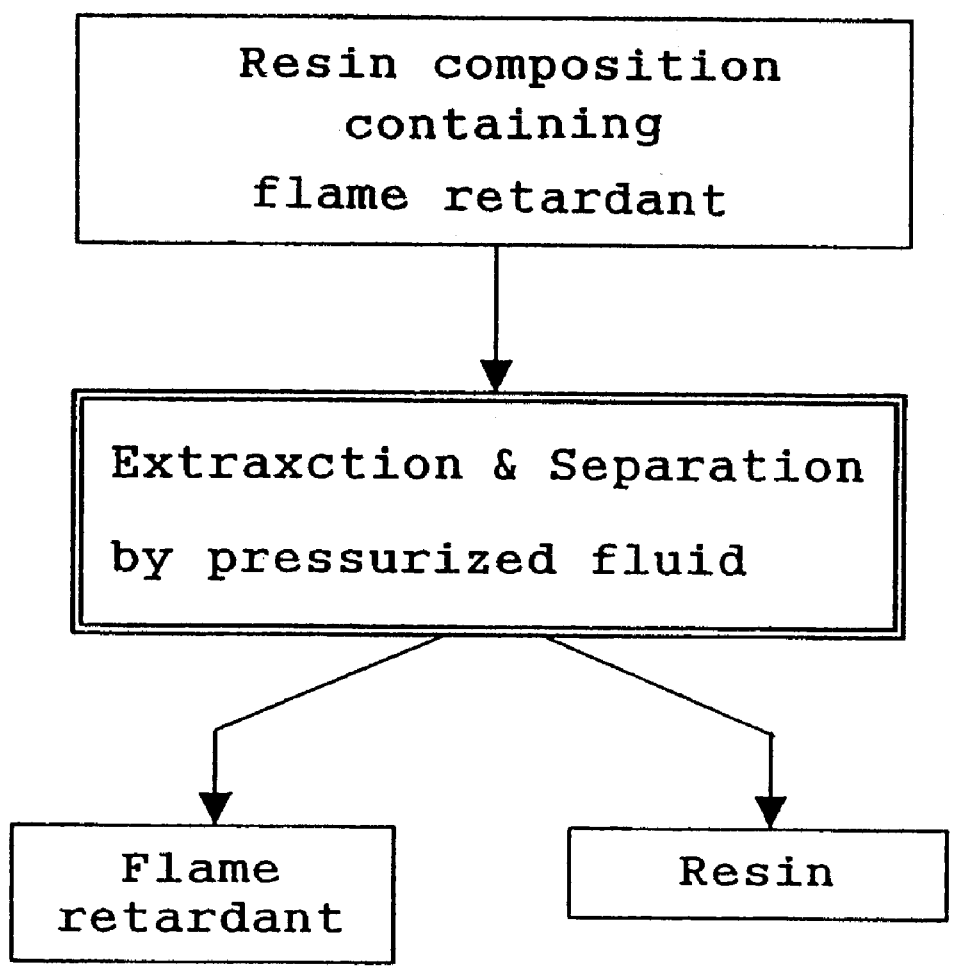
FIG. 1 is a block diagram showing the process of the first embodiment of the present invention.

FIG. 1 is a block diagram showing the process of the first embodiment of the treatment method according to the present invention. According to the method for treating a flame retardant resin composition of the present invention, for removing the flame retardant component from a flame retardant resin composition, the pressurized fluid is used to extract the flame retardant, whereby the flame retardant is separated from the flame retardant resin composition and the resin component and the flame retardant are recovered separately. The resin component and the flame retardant are substantially subject to no degradation and have good qualities well-suited for reuse.

Figure 3:
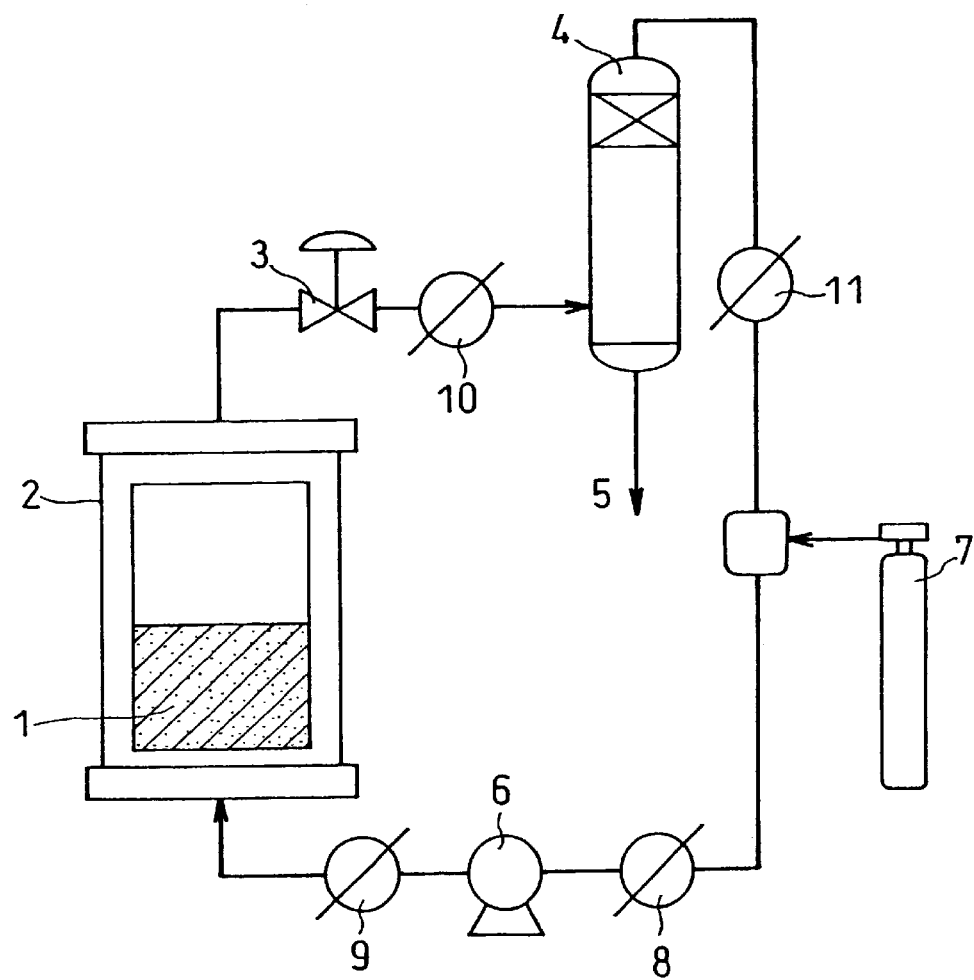
FIG. 3 is a diagram of an apparatus employed for carrying out the first embodiment of the present invention.

FIG. 3 shows the structure of an example of the treatment apparatus for use in the first embodiment of the treatment method according to the present invention. A flame retardant resin composition 1 containing a flame retardant is fed to a highly pressurized vessel 2. Into the vessel 2 is injected a solvent as the pressurized fluid with the pressure controlled by a metering pump 6 and a pressure controlling valve 3. This solvent enables the extraction of the flame retardant from the flame retardant resin composition 1 in a highly pressurized state. The solvent which is in a highly pressurized and fluidized state is of high dispersibility and permeates deep into the inside of the resin composition, so that the extraction of the flame retardant becomes easier. The solvent containing the flame retardant thus extracted is transferred to a separation vessel 4 for separating a gas and a liquid from each other through reduction of the pressure thereof, at which the solvent containing the flame retardant is separated into the solvent in a gaseous state and the flame retardant and the flame retardant is then drawn off the vessel through a recovery port 5. The gaseous solvent is cooled to liquefaction and then circulated for reuse. A bomb 7 freshly supplies the solvent in an amount equivalent to the amount of a consumed solvent. The temperature at the time of extraction is controlled by a heat exchanger 9 or by regulating the temperature of the highly pressurized vessel 2.

Figure 2:
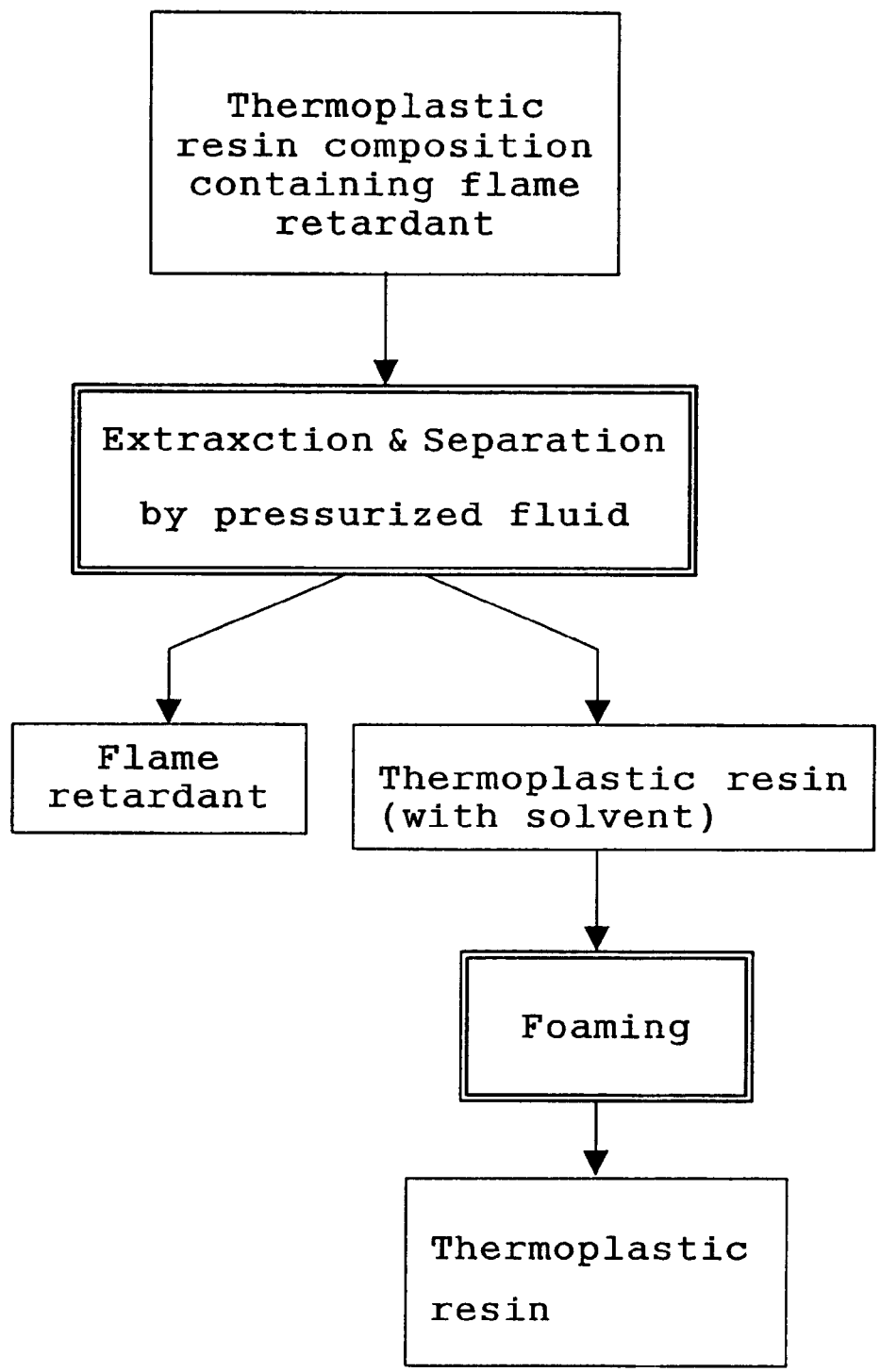
FIG. 2 is another block diagram showing the process of the first embodiment of the present invention.

FIG. 2 is another block diagram showing the process of the first embodiment of the treatment method according to the present invention. When the resin constituting a flame retardant resin composition is a thermoplastic resin, the flame retardant is extracted with the use of a pressurized fluid, enabling the provision of the resin and the flame retardant both suitable in quality for reuse. Further, the resin thus separated is foamed using the solvent used in the extraction. Through the treatment, the resin is fragmentized or, due to bubbles formed therein, the density thereof is lowered and consequently the resin becomes brittle. This makes the processing of the resin in a form or condition suitable for reuse easier. That is, since the strength of the resin is lowered, it is made possible to conduct a secondary treatment as post-treatment such as pelletization, granulating, powdering, or fragmentation of the recycled resin with ease.

The reason why such effect is obtained may be such as will be explained below. Since the solvent employed as the pressurized fluid has high diffusibility and permeability toward the rein composition, it remains in the resin composition even after the extraction of the flame retardant. Under atmospheric pressure, the solvent is gradually emitted from the resin. At that time, by controlling the hardness of the resin and the emission rate of the solvent, the resin can be foamed. Although such foaming treatment is applicable regardless of whether the resin to be employed is a thermosetting resin or a thermoplastic resin, the use of the thermoplastic resin is particularly preferred, because the hardness of the resin can be controlled by heating.

The foaming treatment is carried out in any of the following manners in concrete, but not limited to these.

(1) After the extraction has been completed, while keeping the resin heated in the vessel up to a temperature higher than the softening point, the pressurized fluid is discharged from the vessel.

(2) After the extraction has been completed, the resin is taken out of the vessel and then heated up to a temperature higher than the softening point.

(3) After the extraction has been completed, the resin is taken out of the vessel and then heated up to a temperature higher than the softening point while the pressure is reduced to the atmospheric pressure or lower.

The temperature at which the resin softens means the glass transition temperature, softening point, melting point, and the like.

Hereinafter, the details of the first embodiment of the method for treating a flame retardant resin composition according to the present invention will be described.

As the flame retardant used in the present invention, a halogen-containing flame retardant is preferable and an addition-type halogen-containing flame retardant is more preferable. This is because a flame retardant of the addition-type is easily extracted from the resin and recovered, and the use of a halogen-containing flame retardant which is susceptible to thermal degradation is effective. For example, there are exemplified decabromodiphenyl, decabromodiphenyl ether, tetrabromobisphenol A, tetrabromobisphenol A-bis(2,3-dibromopropyl ether), tetrabromobisphenol A-bis (allyl ether), hexabromocyclododecane, tribromophenol, tetrabromophthalic anhydride, bistetrabromophthalimide, chlorinated paraffin, chlorinated polyethylene and the like.

Although there can be exemplified other flame retardants such as phosphorus-type flame retardants, nitrogen-type flame retardants, silicone-type flame retardants, antimony tetraoxide, aluminum hydroxide, and boron compounds. Only if the flame retardant to be employed in the present invention need only be of the addition-type, the same effect as described above can be obtained. Even the reaction-type flame retardant can be adopted for use, if the molecular weight of the reaction product is low.

In the present invention, the resin component being a constituent of a flame retardant resin composition may be either a thermoplastic resin or a thermosetting resin. Exemplified as the thermoplastic resin are polyethylene, polyolefine, polypropylene, polystyrene, polyethylene terephthalate, polybutylene terephthalate, polycarbonate, nylon, polyvinyl chloride, acrylonitrile-butadiene-styrene copolymer and the like. To the flame retardant resin composition may be added a filler and the like.

As the thermosetting resin, there are mentioned, for example, cured phenolic resins, cured epoxy resins, cured unsaturated polyester resins, polyurethane, urea resin and the like. In this case, the flame retardant resin composition may be filled with a non-woven fabric or glass fibers to constitute a composite material.

Carbon dioxide is suitable as the solvent constituting the pressurized fluid in the present invention. Due to the high permeability into resins, carbon dioxide readily and diffusively permeates deep into the resin composition. Particularly, if the pressurized fluid is in the supercritical condition, the permeability is improved to effect the extraction. The pressure (critical pressure) and temperature (critical temperature) of carbon dioxide in the supercritical condition are 7.38 MPa and 31.1° C., respectively, and carbon dioxide reaches the supercritical condition at a relatively low temperature to exhibit the high diffusibility. Further, the use of carbon dioxide is effective in preventing thermal degradation of the resin or flame retardant, since it enables the extraction to be carried out at a low temperature. In addition, in the extraction treatment, since the flame retardant can be efficiently removed at a low temperature, high energy is unnecessary for the treatment.

Water, alcohol, or the like also can be employed as the solvent. When extracting antimony oxide or aluminum hydroxide, the use of water leads to good results.

In the first embodiment of the treatment method according to the present invention, it is suitable that the pressure of the pressurized fluid falls within the range of from half the critical pressure of a solvent employed as the pressurized fluid to five times the critical pressure. Since the solubility of a solute increases as the density of the pressurized fluid greatly rises in the vicinity of the critical pressure and the extraction is favorably effected, the above-mentioned range of pressure is preferably employed in the present invention. The solubility begins to rise at a pressure of about half the critical pressure of the solvent and shows the tendency of saturation at the point where the pressure reaches approximately five times the critical pressure. Especially, the range of from the critical pressure of the solvent to three times the critical pressure is preferably employed from the viewpoints of extraction effects and ease of operation. In the present invention, if carbon dioxide is used as the solvent, it is preferred that the extraction is carried out at a pressure within the range of from about 7.4 MPa to about 22.2 MPa.

However, since it is possible to cause reactions even if the pressurized fluid has not yet reached the supercritical condition and is in the sub-supercritical condition, the extraction can be carried out. The term "sub-supercritical condition" has no concrete definition, but it means, in the present invention, a condition having a pressure of not lower than half the critical pressure and equal to or higher than the critical pressure and a temperature of not lower than half the critical temperature and equal to or higher than the critical temperature.

If the extraction temperature is higher than room temperature and lower than 200° C., the resin is not carbonized and elimination of halogens from the flame retardant hardly occurs. Consequently, it is possible to smoothly extract, separate, and recover the flame retardant. Since an object of the present invention is to reuse both the resin and the flame retardant, it is preferred that the treatment is performed at a temperature within the range of from 0 to 200° C. Depending on the purpose the resin is recycled for, even temperatures exceeding 200° C. are in some cases suitable. That is, it is possible to treat the resin without carbonization even at a temperature within in the range of not lower than 200° C. and lower than 400° C., and such range is suitable for the case where only the resin is recycled since elimination of the halogens from the flame retardant occurs. Moreover, a carbonized product is generated from the resin and halogens are eliminated from the flame retardant in the range of 400 to 600° C., and such range is suitable for the case where only the resin is reused as a carbonized product. If the temperature exceeds the upper limit of that range, the amount of the carbonized product to be recovered is also reduced, which is unfavorable in the treatment process of the present invention.

In the present invention, an auxiliary solvent may be added to the solvent for use in the extraction. Namely, the pressurized fluid may contains the auxiliary solvent as well as the solvent. It is preferred that the pressuried fluid contains, in addition to the solvent, not less than 1 mol % and less than 50 mol % of the auxiliary solvent. Moreover, it is particularly preferred that the pressurized fluid contains not less than 1 mol % and less than 20 mol % of the auxiliary solvent. This auxiliary solvent, together with the solvent mentioned above, constitutes the pressurized fluid, and may be added at a small amount. The auxiliary solvent mixed with the solvent enhances the affinity between the flame retardant to be extracted and the pressurized fluid and consequently raises the efficiency of extraction of the pressurized fluid. In the first embodiment of the treatment method according to the present invention, in the case where a halogen-containing flame retardant is used, preferably employed as the auxiliary solvent is an alcohol such as methyl alcohol, ethyl alcohol, n-propyl alcohol, or isopropyl alcohol, a hydrocarbon such as hexane, propane, butane, cyclohexane, or pentane, a ketone such as acetone, an ester such as ethyl acetate, methyl acetate, or isoamyl acetate, or water. It is noted that examples of the auxiliary solvent are not limited to these and any auxiliary solvent can be employed provided that the efficiency of extraction is not adversely affected.

In the present invention, for efficiently extracting the flame retardant from a flame retardant resin composition, the flame retardant resin composition may be washed, crushed, or powdered in advance. Moreover, for treating the resin composition more efficiently, it is preferred that the treatment is carried out at a temperature not lower than the temperature at which the thermoplastic resin softens. Particularly, if the resin is one that can be handled even in a softened state or molten state, it is possible to continuously supply the flame retardant resin composition to the extraction vessel, continuously conduct the extraction, and continuously recover the flame retardant and the resin.

Second Embodiment of the Process of Treatment

Hereinafter, the second embodiment of the method for treating a flame retardant resin composition according to the present invention will be described, which comprises a step of bringing at least part of a flame retardant resin composition containing a resin and a flame retardant into contact with a pressurized fluid constituted of a solvent thereby to reduce the flame retardancy of the flame retardant resin composition.

In the second embodiment of the treatment method according to the present invention, the flame retardant component is removed from a flame retardant resin composition having a halogen-containing flame retardant by bringing the flame retardant resin composition into contact with a pressurized fluid to remove halogen components therefrom through dehalogenation. It is noted that, in the second embodiment of the treatment method, the term "flame retardant component" means a flame retardant and, particularly, a halogen component (element) chemically bonded to a resin composition component.

Moreover, the second embodiment of the method for treating a flame retardant resin composition according to the present invention by removing the flame retardant component from the flame retardant resin composition comprises, for achieving the above-mentioned objects, a dehalogenation step by bringing the flame retardant resin composition having the halogen-containing flame retardant into contact with the pressurized fluid to remove halogen components therefrom through dehalogenation and a reducing step of reducing the dehalogenated flame retardant resin composition by using the pressurized fluid.

Furthermore, the method for treating a flame retardant resin of the present invention by removing the flame retardant component from the flame retardant resin composition comprises, for achieving the objects mentioned above, a dehalogenation step by bringing the resin composition containing the halogen-containing flame retardant into contact with the pressurized fluid to remove halogen components therefrom, a reduction step of reducing the dehalogenated resin composition using the pressurized fluid, and a foaming step of foaming the dehalogenated resin composition.

In the foaming step, after bringing the pressurized fluid into contact with the dehalogenated resin, the dehalogenated resin is foamed with the use of the solvent employed as the pressurized fluid, which realizes an efficient reprocessing of the resin.

Furthermore, in the second embodiment of the method for treating a flame retardant resin composition of the present invention, it is made easier to recycle the resulting resin further by conducting an extraction step of extracting and removing a halogen-free flame retardant.

In the second embodiment of the treatment method of the present invention, in the dehalogenation step, the reduction step, or the foaming step, the resin is efficiently treated when the temperature of the pressurized fluid is within the range of from 50 to 400° C. Moreover, in the dehalogenation step, the reduction step, or the foaming step, an efficient treatment is possible when the pressure of the pressurized fluid is in the range of from half the critical pressure of the solvent constituting the pressurized fluid to three times the critic al pressure. Further, in the dehalogenation step, the reduction step, the foaming step, or the extraction step, an efficient treatment is realized when the pressurized fluid is composed of a solvent comprising carbon dioxide as the main component.

As the halogen-containing flame retardant used in the second embodiment of the treatment method according to the present invention, a bromine-containing flame retardant is preferred. Moreover, the resin used in the present invention is preferably a thermoplastic resin composition.

Hereinafter, the second embodiment of the treatment method of the present invention will be described more concretely.

According to the present invention, removal of the flame retardant component from the resin composition containing the flame retardant enables the resulting resin component to be recycled. The present invention also makes it possible to remove the flame retardant component from the resin composition containing the flame retardant while inhibiting the degradation of the resin due to heat. Moreover, the present invention realizes the recycle of the resin by removing the flame retardant component therefrom while inhibiting the degradation due to heat, and the recycled resin can be reprocessed in a form convenient for use.

In first, the effect of the pressurized fluid comprising a solvent to be employed in the present invention will be described. The present invention is characterized in that the flame retardant component is efficiently removed using a solvent as the pressurized fluid and that the quality of the resulting resin component is efficiently improved through the use of the solvent as the pressurized fluid. A variety of solvents, when highly pressurized, become high in density as fluids and show effects such as improved solubility in solutes and permeability into the objective resin composition accompanied by improved reactivity. Moreover, since the effect of allowing a reactive substance such as a reducing agent to permeate into the resin composition is high, it is possible to improve the evenness of the reaction and the yield. Particularly, if the solvents become supercritical fluids beyond their critical points and the temperature effect is added thereto, their motion energy rises and reactivity, solubility, permeability, extraction performance and the like are also improved. The present invention utilizes the characteristics of such pressurized fluids to regenerate and recycle flame retardant resins.

Then, the second embodiment of the treatment method according to the present invention will be described with reference to FIGS. 4 to 6.

Figure 4:
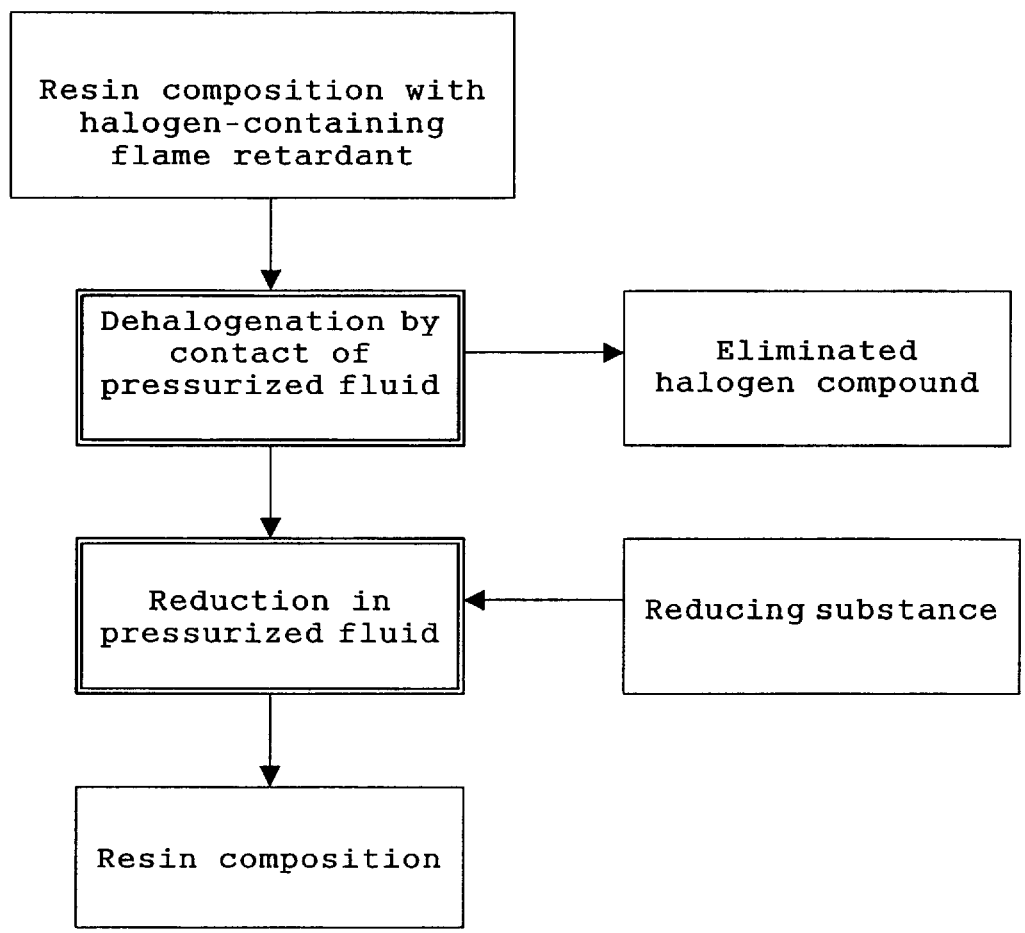
FIG. 4 is a block diagram showing the process of the second embodiment of the present invention.

FIG. 4 is a block diagram showing the process of the second embodiment of the treatment method according to the present invention. In the second embodiment of the method for treating a flame retardant resin composition according to the present invention, for removing a flame retardant component from a resin composition containing a halogen-containing flame retardant, the flame retardant resin composition is brought into contact with a pressurized fluid to eliminate halogens therefrom in the form of a halogen compound such as a halogenated hydrogen or a halogen molecule. Although the resin may sometimes undergo partial modification by the formation of double bonds due to the elimination of halogens, it can be recycled without decomposition. Moreover, the halogen compound resulted from the dehalogenation is separated and recovered, because it tends to halogen-ionized to cause corrosion of the apparatus when left in the treatment apparatus. If the purity of the recovered halogen compound is high, it is possible to recycle it as it is.

In this case, since the solvent constituting the pressurized solvent shows high diffusibility and permeability toward the resin composition, the use of the pressurized fluid realizes an efficient dehalogenation deep into the resin composition.

Figure 5:
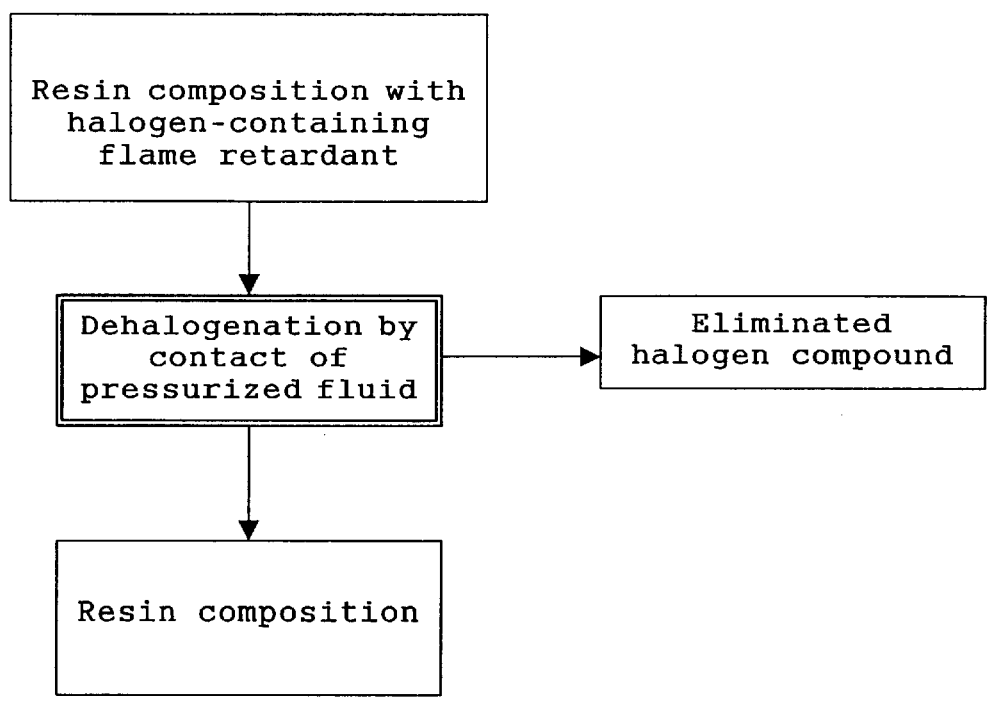
FIG. 5 is another block diagram showing the process of the second embodiment of the present invention.

FIG. 5 is another block diagram showing the process of the second embodiment of the treatment method according to the present invention. In the method for treating a flame retardant resin composition of the present invention, in order to remove halogens, which is the flame retardant component, from a resin composition containing a halogen-containing flame retardant, the flame retardant resin composition is brought into contact with a pressurized fluid to eliminate halogens therefrom in the form of a halogen compound such as a halogenated hydrogen or a halogen molecule. Although the resin is not decomposed, due to the elimination of halogens, it may sometimes undergo partial modification such as formation of double bonds or crosslinking. Such partial modification causes decoloration or degradation of the recycled resin and therefore is unfavorable for recycling in which the recycled product is required to be of good quality. Accordingly, as the next step, the modified portion is restored by subjecting the dehalogenated resin composition to reduction, whereby a resin composition of good quality can be obtained. The reduction can be conducted just by bringing the dehalogenated resin composition into contact with a pressurized fluid to which a reducing substance such as a reducing agent, hydrogen or a compound which generates hydrogen upon reaction is added. This treatment enables the regenerated resin to be fed to a resin mold again and reused.

In this case, the use of the pressurized fluid realizes not only an efficient dehalogenation but also an efficient reduction deep into the resin composition, for the solvent constituting the pressurized fluid is highly diffusible and permeable into the resin composition.

Figure 6:
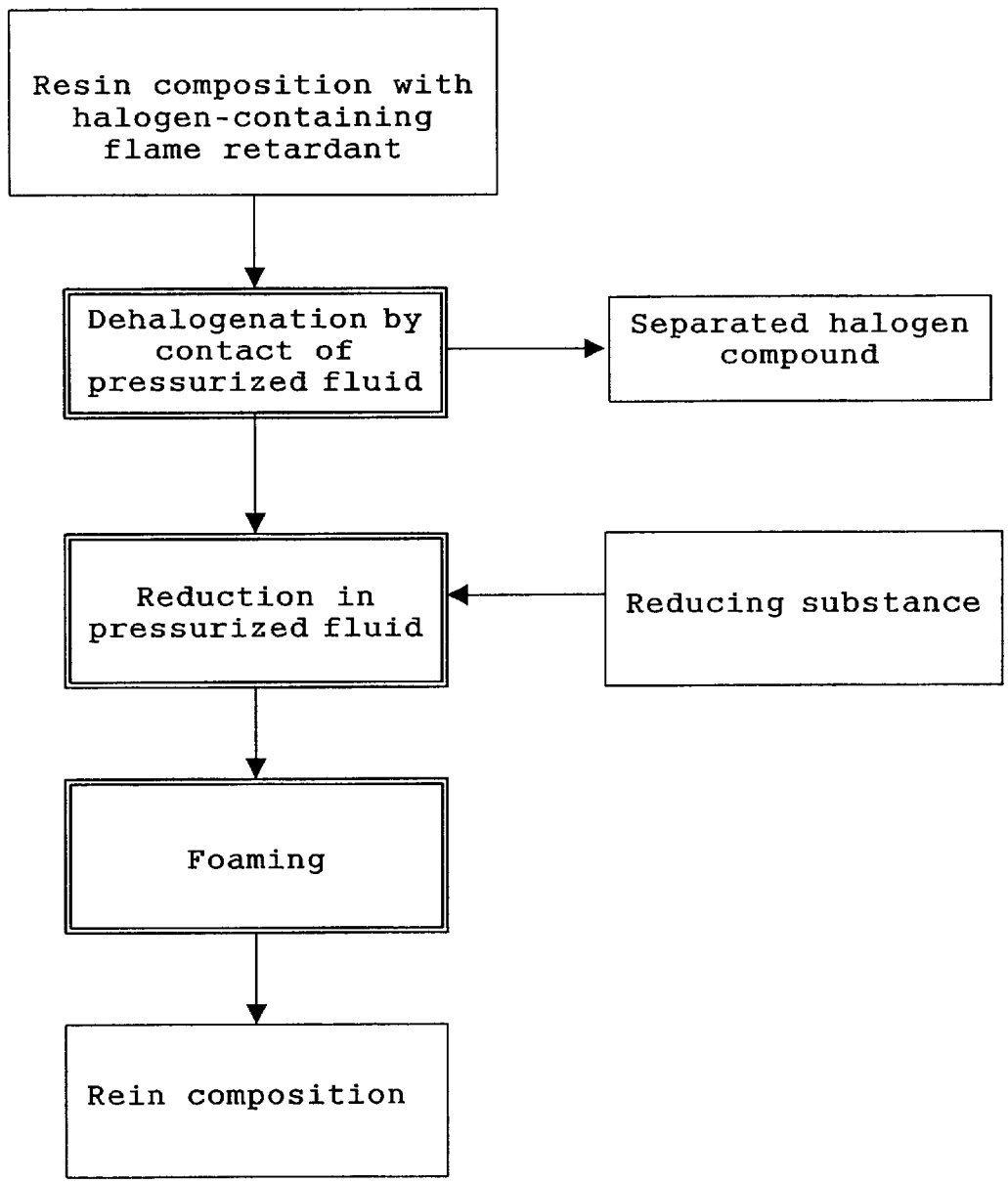
FIG. 6 is still another block diagram showing the process chart of the second embodiment of the present invention.

FIG. 6 is still another block diagram showing the process of the second embodiment of the treatment method according to the present invention. In the method for treating a flame retardant resin composition of the present invention, a resin composition containing a halogen-containing flame retardant is brought into contact with a pressurized fluid for dehalogenation. In the next step, the dehalogenated resin composition is brought into contact with the pressurized fluid for reduction, whereby the modified portion is restored and the quality of the resulting resin composition is improved. Further, the resin composition is brought into contact with the pressurized fluid to allow the solvent to permeate thereinto. At that time, the resin is foamed by the solvent permeated into the resin composition. Through this foaming step, the resin is crushed or, due to bubbles formed therein, will be of low density and consequently becomes brittle. By making the resin brittle, it becomes easier to process the resin in a form suitable for remolding and reuse. In other words, since the strength of the resin is lowered, a second treatment such as pelletization, granulating, powdering and crushing as post treatment of the recycled resin can be carried out with ease.

The reason why such effect can be obtained is the same as that explained in connection with the first embodiment of the treatment method described above.

The foaming treatment may be conducted in the same manner as that in the case of the first embodiment.

Hereinafter, the second embodiment of the method for treating a flame retardant resin composition will be described in concrete. Basically, the method can be carried out under the same conditions as those in the case of the first embodiment, but they are not necessarily the same because of the difference in mechanism for reducing the flame retardancy.

Preferred as the flame retardant in the second embodiment are halogen-containing flame retardants. Among them, bromine-containing flame retardants which are particularly in wide use are preferred. This is because these flame retardants impart an excellent flame retardancy in aromatic resins such as styrenic resin and a large amount of styrenic resin has been employed for use in a variety of housings and parts for household electric appliances and, therefore, there can be expected a great effect that a large amount of styrenic resin can be treated. Examples of the bromine-containing flame retardant are phenyl oxide-type flame retardants such as decabromodiphenyl oxide, octabromodiphenyl oxide, and tetrabromodiphenyl oxide, bisphenol A-based flame retardants such as tetrabromobisphenol A (TBA), and other bromine-containing flame retardants such as hexabromocyclododecane, bistribromophenoxyethane, tribromophenol, ethylenebistetrabromophthalimide, tetrabromophthalic anhydride, bistetraphthalimide, TBA polycarbonate oligomer, brominated polystyrene, and TBA epoxy oligomer. As the chlorine-containing flame retardant, there are mentioned, for example, chlorinated paraffin, chlorinated polyethylene, perchlorocyclopentadecane, chlorendic acid and the like.

Other flame retardants include phosphorus-containing flame retardants, nitrogen-containing flame retardants, silicone-based flame retardants, antimony trioxide, aluminum hydroxide, boron-containing compounds and the like. These are used either alone or in combination depending on the kind of the resin to which the flame retardant is added and the intended use. The content of the flame retardant is adjusted according to the purpose.

Examples of the resin to which the second embodiment of the treatment method according to the present invention is applicable are the same as those mentioned in the case of the first embodiment. It is noted that the flame retardant resin composition may contain additives such as flame retardant auxiliaries, stabilizers, coloring agents, flowability improving agents, and mold releasing agents.

As the solvent to be used in the second embodiment of the treatment method according to the present invention, any of a variety of organic solvents such as alcohol can be employed but carbon dioxide and water are particularly preferred.

Due to the high permeability into resins, carbon dioxide readily diffuses deep into resin compositions. By using the pressurized fluid comprising carbon dioxide particularly when it is in the supercritical condition, the permeability is further improved and thus the excellent extracting performance is exhibited. In addition, an improvement in reactivity in the resin composition can be expected. As to the application to each step of the treatment method, the use of carbon dioxide is adoptable in any of the dehalogenation step, reduction step, foaming step, and extraction step. Particularly, since carbon dioxide is a gas, the use in the final treatment step makes a drying step for removing the solvent after treatment unnecessary, consequently simplifying the process. Moreover, the pressure (critical pressure) and temperature (critical temperature) of carbon dioxide in the supercritical condition are 7.38 MPa and 31.1° C., respectively. At or beyond this critical point, carbon dioxide reaches the supercritical condition. As described above, since carbon dioxide reaches the supercritical condition at such a low temperature to exhibit a high diffusibility, it is possible to realize an efficient treatment at a low temperature and a large amount of energy is not required.

If the temperature and pressure of water rise, in addition to improvements in the diffusibility and permeability, for example, oxidation catalyzing properties and hydrolizability due to incease in ion product are intensified. When utilizing these properties and employing water in the second embodiment of the treatment method, water can be used in the dehalogenation step, reduction step, foaming step, and extraction step. Among them, the use of water is particularly effective in the dehalogenation step and the reduction step in which reactions are caused. The pressure (critical pressure) and temperature (critical temperature) of water in the supercritical condition are 22.1 MPa and 374.1° C. respectively and, at or beyond the critical point, water reaches the supercritical condition. However, since effects on reactivity can be obtained even if water is not reached the supercritical condition and is in a sub-supercritical condition, water can be used under such condition. The term "sub-supercritical condition" has no concrete definition, but it means such a condition having a pressure of not lower than half the critical pressure and lower than the critical pressure and a temperature of not lower than half the critical temperature and lower than the critical temperature.

Moreover, the pressurized fluid in the second embodiment of the treatment method according to the present invention may contain, for the same reason mentioned in the case of the first embodiment, an auxiliary solvent in addition to the solvent. Such effects as described in connection with the first embodiment can be effectively achieved when the pressurized fluid contains not less than 1 mol % to less than 50 mol %, particularly not less than 1 mol % to less than 20 mol % of an auxiliary solvent. Particularly, in the case of a halogen-containing flame retardant, as the auxiliary solvent, there are exemplified reducing substances as to cause a reduction reaction such as hydrogen and carbon monoxide, alcohols such as methyl alcohol, ethyl alcohol, n-propyl alcohol, and isopropyl alcohol, hydrocarbons such as hexane, propane, butane, cyclohexane, and pentane, and ketones such as acetone, and esters such as ethyl acetate, methyl acetate, and isoamyl acetate, and these can be preferably employed either alone or in combination.

It is suitable that the pressure of the pressurized fluid to be employed in each step in the second embodiment of the treatment method according to the present invention falls within the range of from half the critical pressure of the solvent for use in the pressurized fluid to three times the critical pressure. Since the solubility of the solute gets high as the density of the pressurized fluid increases in the vicinity of the critical pressure and the extraction is favorably effected, the above-mentioned range of pressure is employed in the present invention. The solubility begins to rise at a pressure of about half the critical pressure of the solvent and shows the tendency of saturation at the point where the pressure reaches approximately three to five times the critical pressure. Especially, the range of from the critical pressure of the solvent to three times the critical pressure is preferably employed from the viewpoints of high permeation and ease of operation.

Moreover, although the upper limit of the temperature range of the pressurized fluid used in each of the steps in the present invention is different from resin to resin, it is preferred to be room temperature or higher than 50° C. and not higher than 400° C. So far as the temperature of the pressurized fluid is within this range, the resin is not carbonized in each step and elimination of halogens from the flame retardant is made possible. Moreover, since the degree of degradation of the recycled resin is restrained low even in the reduction step and the foaming step, the above-mentioned temperature range is preferable. Further, since halogens are eliminated from the flame retardant and the resin produces a carbonized product, a temperature range of from 400 to 600° C. is suitable for the case of recycling the resin as a carbonized product.

Then, each of the dehalogenation step, reduction step, foaming step, and extraction step in the second embodiment of the treatment method according to the present invention will be described.

In the dehalogenation step in the second embodiment of the treatment method according to the present invention, halogens in the halogen-containing flame retardant, which is contained in a flame retardant resin composition, is eliminated and removed. It has been known that heating of the flame retardant resin composition results in the formation of halogenated hydrogen due to elimination of halogens, indicating that dehalogenation can be effected by heating. In the case of heat treatment, dehalogenation is effected with the temperature of the pressurized fluid set at 100° C. or higher, preferably at a temperature within the range of from 200° C. to 400° C. At that time, since the pressurized fluid is efficiently permeated into the resin composition, dehalogenation proceeds efficiently. Moreover, other ways include irradiation of light from the exterior of the reaction vessel for acceleration of the dehalogenation. It is also possible to carry out the dehalogenation step simultaneously with the reduction step, whereby dehalogenation and reduction can be effected at the same time. This process enables the dehalogenation to be effected at a still lower temperature, and the treatment can be effected at room temperature, preferably at 50° C. or higher.

Thereafter, in the reduction step, reduction is effected in the coexistence of a reducing substance which causes a reduction reaction of the pressurized fluid. Particularly, hydrogenation enables unsaturated double bonds resulted from the dehalogenation of the flame retardant to be restored, consequently improving the quality of the recycled resin. If the dehalogenation and the reduction are simultaneously are carried out, it is made possible to provide a recycled resin with the same quality as that of the original one without formation of unsaturated double bonds due to the halogenated hydrogen generated due to the dehalogenation. The hydrogenating reaction in the reduction step is conducted in the pressurized fluid so that the reactivity is high and, therefore, it is possible to allow such a reducing substance as hydrogen to permeate deep into the resin with efficiency.

According to the present invention, for conducting the reduction treatment efficiently by allowing the pressurized fluid to permeate deep into the resin composition, hydrogen is supplied in any of the ways described below.

1) Introduction of hydrogen
2) Introduction of carbon monoxide which converts to hydrogen through a water gas shift reaction in the coexistence of water
3) Introduction of a hydrocarbon compound for generating hydrogen from carbon monoxide through a water gas shift reaction, carbon monoxide resulting from partial oxidation in the presence of oxygen
4) Introduction of a hydrogen-donating solvent such as tetralin, petroleum heaviy oil, and edible oil Moreover, for accelerating the hydrogenating reaction, conventional hydrogenation catalysts or hydrogenolysis catalysts as a copper catalyst, a nickel catalyst, copper oxide, iron oxide, and a palladium-supported catalyst may be used. The temperature of the pressurized fluid for use in the reduction is from room temperature to about 200° C. when using a catalyst and room temperature to about 400° C. when no catalyst is used.

The foaming step in the second embodiment of the treatment method according to the present invention is conducted by utilizing the above-described high permeability of the pressurized fluid into the resin to allow the resin to be impregnated with the pressurized fluid and then by rapidly releasing the pressurized fluid. Since the foaming operation is more effective when the resin is softened, it is suitably applied to the case of a thermoplastic resin. The treatment temperature is preferably within the range of from 50 to 300° C. The foaming step may be carried out after the resin is impregnated with the solvent constituting the pressurized fluid in the above-described dehalogenation step or the reduction step.

The extraction step in the second embodiment of the treatment method according to the present invention is effective when the flame retardant resin composition contains a flame retardant other than the halogen-containing flame retardant. That is, when removing an addition-type halogen-free flame retardant such as antimony trioxide, it is effectively carried out through extraction with a pressurized fluid, in which case, due to such characteristics as solubility and permeability of the pressurized fluid, an efficient removal throughout the resin can be achieved. The quality of the resin to be recycled is improved through this treatment. This extraction step is not required to be carried out separately from the other steps. The extraction may be effected simultaneously in any of the dehalogenation step, reduction step, and foaming step with the pressurized fluid.

Moreover, the steps of the present invention may be carried out successively, but it is also possible to conduct a series of steps simultaneously, whereby an efficient treatment is realized.

Furthermore, in the present invention, for treating a flame retardant resin composition efficiently, the resin composition to be treated may be previously washed, crushed, and powered.

There is no particular restriction as to the apparatus to be used in the treatment of the present invention provided that it can hold the pressurized fluid. However, from the viewpoint of prevention of corrosion due to an eliminated halogen compound, the use of vessels and pipes made of a corrosion-resistant nickel alloy such as Inconel or Hastelloy, titanium, or titanium alloy is preferred. In the case where the neutralization of the halogen compound is simultaneously carried out, ordinary vessels made of stainless steel can be employed. When the separation and recovery are carried out, the use of such a vessel having a portion made of a corrosion-resistance material where the halogen compound may exist or be contacted to. This enables a reduction in investment in equipment.

Hereinafter, the process for treating a flame retardant resin composition of the present invention will be described more concretely based on Examples, but these should be no means be construed as defining the scope of the present invention. Examples 1 to 5 were carried out in accordance with the first embodiment of the treatment method, and Examples 6 to 10 were carried out in accordance with the second embodiment of the treatment method.

EXAMPLE 1

5 g of plates (size: 3 cm×3 cm, thickness: 1 mm) made of a polystyrene resin composition containing about 10% by weight of decabromodiphenyl ether as the flame retardant was put in a 0.1L-pressurized extraction vessel and the flame retardant was extracted using carbon dioxide in the supercritical condition of 50° C. and 10 MPa as the pressurized fluid (solvent). The extraction solvent was sent to a gas-liquid separating vessel to recover the flame retardant. In the pressurized extraction vessel was left the plates made of the polystyrene resin composition, from which the flame retardant was removed. The recovery of the flame retardant was almost completed through approximately 5 hours of extraction.

About 98% of the flame retardant contained in the resin composition was extracted and removed, and about 95% of the flame retardant was recovered from the separation vessel. Moreover, the flame retardant thus recovered had a purity of about 98%, and the degree of degradation was low.

EXAMPLE 2

5 g of strips (size: 10 cm×0.5 cm, thickness: 1 mm) made of a cured phenolic resin composition containing about 10% by weight of tribromophenol as the flame retardant was put in a 0.1L-pressurized extraction vessel, and the flame retardant was extracted using carbon dioxide in the supercritical condition of 80° C. and 15 MPa as the solvent. The extraction solvent was sent to a gas-liquid separation vessel to recover the flame retardant, and the strips made of the cured phenolic resin composition, from which the flame retardant was removed, was left in the pressurized extraction vessel. The recovery of the flame retardant was substantially completed through about 5 hours of extraction.

About 95% or more of the flame retardant contained in the resin composition was extracted and removed, and about 95% of the flame retardant was recovered from the separation vessel. Moreover, the flame retardant thus recovered had a purity of 98% or so, and the degree of degradation was low.

By carbonizing the treated cured phenolic resin composition in a pyrolysis furnace, it was possible to produce active carbon. The exhaust gas discharged upon the carbonization contained almost no bromine component. Therefore, it can be expected that, according to the first embodiment of the treatment method of the present invention, degradation of the material, which constitutes the pyrolysis furnace, can be inhibited.

EXAMPLE 3

50 g of plates (size: 3 cm×3 cm, thickness: 1 mm) made of a polystyrene resin composition containing approximately 10% by weight of decabromodiphenyl ether as the flame retardant was put in an 1L-autoclave and the flame retardant was extracted using liquefied carbon dioxide having a vapor pressure at 20° C. of about 5.7 MPa. The recovery of the flame retardant through 1 hour of extraction was repeated 5 times batchwise.

About 95% or more of the flame retardant contained in the resin composition was extracted. The flame retardant thus recovered had a purity of about 99% and it was recovered in a less decomposed or degraded. condition. Moreover, the recovered resin could be palletized and remolded. Since the degree of deterioration in mechanical strength of the obtained pellets was slight, they were sufficiently reusable.

EXAMPLE 4

Except that 5% of hexane as the auxiliary solvent was added to an extracting solvent serving as the pressurized fluid, the flame retardant was extracted from a flame retardant resin composition in the same manner as in Example 1. The extraction and recovery to a degree similar to that in Example 1 was practically completed in about 3 hours, and an increase in the efficiency of flame retardant recovery due to the addition of the auxiliary solvent was observed. The recovered resin and the flame retardant were almost the same in quality as those in Example 1.

EXAMPLE 5

2 g of sheets (thickness: 0.2 mm) made of a polyethylene terephthalate resin composition containing about 5% by weight of decabromodiphenyl ether as the flame retardant was put in a 0.1L-pressurized extraction vessel and the flame retardant was extracted using carbon dioxide in the supercritical condition of 60° C. and 10 MPa as the solvent. The extracting solvent was sent to a gas-liquid separation vessel to recover the flame retardant, and the polyethylene terephthalate resin composition sheet, from which the flame retardant was extracted, was left in the pressurized extraction vessel. The recovery of the flame retardant was practically completed through about 5 hours of extraction.

The sheets were taken out of the pressurized extraction vessel after having been cooled to room temperature, and then readily inserted into a heating furnace controlled at 100° C. In such a condition, carbon dioxide impregnated into the sheets was rapidly gasified, and the resin constituting the sheets in the softened state was foamed. The size of each bubble (pore) formed in the sheets was several ten microns or larger, and the strength of the sheets were lowered to brittleness. The sheets before the extraction were easier to cut than to crush, but the sheets rendered brittle were easy to be crushed and easily milled to be reused in the form of a powder.

EXAMPLE 6

5 g of plates (size: 3 cm×3 cm, thickness: 1 mm) made of an acrylonitrile-butadiene-styrene copolymer resin (ABS resin, weight average molecular weight: 30,000, heat distortion temperature: 220° C.) composition containing about 5% by weight of tetrabromobisphenol A (TBA) as the flame retardant was put in a 0.1L-pressurized vessel and then debromination (dehalogenation) of the flame retardant was conducted using carbon dioxide in the supercritical condition of 350° C. and 15 MPa as the solvent. After the treatment, the resin composition was recovered by releasing the pressure and allowed to stand in an atmosphere at room temperature, whereby carbon dioxide remaining in the resin composition was gradually let out, so that it was unnecessary to dry the resin composition.

Since the debromination was effected at a temperature equal to or higher than the heat distortion temperature, the treated resin composition turned to a lump (bulk) of a deformed and molten resin. Analysis of the bromine component in the resin composition revealed that about 99% or more of the bromine component was removed. Before and after the-treatment, there was observed no large change in weight average molecular weight. Moreover, the resin composition was decolored by debromination, but the treated resin composition showed the same moldability even after the treatment, indicating the sufficient reusability as a recycled resin.

EXAMPLE 7

5 g of plates (size: 3 cm×3 cm, thickness: 1 mm) made of a polystyrene resin (weight average molecular weight: 35,000, heat distortion temperature: 82° C.) composition containing about 5% by weight of tribromophenol as the flame retardant was put in a 0.1L-pressurized vessel and debromination of the flame retardant was carried out using water in the sub-supercritical condition of 250° C. and 20 MPa as the solvent. Thereafter, while keeping the pressure and temperature, a hydrogen gas was supplied to the vessel and the temperature was elevated up to 300° C. After the temperature was reduced to 100° C. and the pressure was slowly lowered to atmospheric pressure, the temperature was reduced to room temperature to recover the resin composition. There was no need for the recovered resin composition to be further subjected to drying.

Since the treatment was effected at a temperature equal to or higher than the heat distortion temperature, the resin composition after the treatment turned to a lump of a deformed and molten resin. Analysis of the bromine component in the resin composition revealed that about 99% or more of the bromine component was removed. The weight average molecular weight of the resin composition after the treatment was slightly lower than that before the treatment. However, substantially no decoloration was observed and the treated resin composition showed the same moldability even after the treatment, indicating the sufficient reusability as a recycled resin.

EXAMPLE 8

5 g of plates (size: 3 cm×3 cm, thickness: 1 mm) made of a polystyrene resin (weight average molecular weight: 35,000, heat distortion temperature: 82° C.) composition containing about 5% by weight of tribromophenol as the flame retardant, and 0.1 g of nickel catalyst was put in a 0.1L-pressurized vessel. A pressurized fluid obtained by mixing water in the sub-supercritical condition of 180° C. and 20 MPa with 3 mol % of carbon monoxide was supplied to the vessel and debromination of the flame retardant was effected. After the temperature was reduced to 100° C. and the pressure was slowly lowered to atmospheric pressure, the temperature was reduced to room temperature to recover the resin composition. There was no need for the recovered resin composition to be further subjected to drying. The condition of the recovered resin composition was the same as that in Example 7, and the bromine component contained in the resin composition had been practically completely removed. Although the weight average molecular weight of the resin composition after the treatment was slightly lower than that before the treatment, the treated resin composition was found to be sufficiently reusable as a recycled resin.

EXAMPLE 9

5 g of plates (size: 3 cm×3 cm, thickness: 1 mm) made of an impact resistant polystyrene resin (HIPS, weight average molecular weight: 36,000, heat distortion temperature: 76° C.) composition containing about 5% by weight of tetrabromobisphenol A (TBA) as the flame retardant, and 5 g of tetralin as the hydrogen-donating auxiliary solvent were put in a 0.1L-pressurized vessel, and debromination and reduction of the flame retardant were carried out using carbon dioxide in the supercritical condition of 300° C. and 15 MPa as the solvent.

After these steps, the resin composition was cooled down to 40° C., i.e., below the heat distortion temperature. Then, the pressure was released to recover the resin composition and the resin composition was readily inserted into a reduced pressure heating furnace controlled at 150° C., whereby carbon dioxide impregnated into the resin composition was rapidly gasified and the resin composition in a softened state was foamed. Observation of an cross section of the foamed resin composition revealed that the size of each bubble in the resin composition was several ten microns or so and brittleness of the resin due to a decrease in strength.

Analysis of the bromine component in the resin composition revealed that about 99% or more of the bromine component had been removed. The weight average molecular weight of the resin composition after the treatment was slightly lower than that before the treatment. However, practically no decoloration was observed. Due to the brittleness, when re-molding the foamed resin composition, it was easily crushed and recycled as a powdered molding resin material.

EXAMPLE 10

5 g of plates (size: 3 cm×3 cm, thickness: 1 mm) made of a polystyrene resin (weight average molecular weight: 35,000, heat distortion temperature: 82° C.) composition containing about 5% by weight of tribromophenol and 2% by weight of antimony trioxide as flame retardants was put in a 0.1L-pressurized vessel, and a pressurized fluid prepared by mixing 3 mol % of carbon monoxide as the auxiliary solvent into water in the sub-supercritical condition of 250° C. and 20 MPa was supplied to the vessel to carry out the debromination of the flame retardants. In this treatment, the pressurized fluid was introduced to a gas-liquid separation vessel after the temperature had been lowered by a heat exchanger, at which the gaseous component and the solid-liquid component were separated from each other. The gaseous component contained water, hydrogen, carbon monoxide, carbon dioxide, and brominated hydrogen, and the solid-liquid component contained antimony trioxide, moisture, and a small portion of substances which might be the additives added to the resin composition.

The condition of the recovered resin composition was similar to that in Example 7, and the bromine component had been practically completely removed. A reduction in the amount of antimony trioxide was also observed. These facts suggest that dehalogenation of the bromine-containing flame retardant and extraction of antimony trioxide were effected. The weight average molecular weight of the resin composition thus obtained was slightly lower than that before the treatment, but the quality of the resin was sufficient for use as a recycled resin.

According to the first embodiment of the method for treating a flame retardant resin composition of the present invention, such excellent effects as will be described below can be obtained by extracting the flame retardant from a flame retardant resin composition using a pressurized fluid.

That is, it is possible to recover the resin component and flame retardant without degradation, and these can be reused as good recycled materials.

Moreover, when a thermoplastic resin is employed, after the extraction step, by foaming the resin using the solvent employed in the extraction to make the resin brittle, it is made easier to pelletize or powder the treated resin, which leads to ease of handling at the time of the reuse.

Further, in the case where a thermosetting resin which is generally difficult to be recycled, the material recycling is made easier by removing the flame retardant. For example, when the carbonized product of a thermosetting resin is material-recycled, in the carbonization step, generation of halogenated hydrogen or other substances due to dehalogenation does not occur. Therefore, as the material of the treatment apparatus, there is no need to employ a specific halogen-resistant material and it is possible to use a cheap and common material. Moreover, it is also possible to reduce the investment in equipment for treating exhaust gas.

Moreover, as to the material of the apparatus for treating a flame retardant resin composition, since the flame retardant component is extracted in the form of a flame retardant without dehalogenation, such an ordinary material as stainless steel can be employed for the pressurized vessel or pipes. Therefore, there is no need to employ a specific and expensive halogen-resistant material.

Also in the case where the resin is used as a reducing agent for iron ore in a blast furnace or a coke oven material, since a resin which does not generate halogenated hydrogen can be obtained by removing the flame retardant in advance, it can be reused without the fear of degradation of pipes, and the like.

On the other hand, the second embodiment of the method for treating a flame retardant resin composition of the present invention comprises a basic step of bringing a resin composition containing a halogen-containing flame retardant into contact with a pressurized fluid to effect dehalogenation, whereby a reusable resin can be obtained without decomposition of the resin component. That the following effects can be obtained was found out.

That is, there can be obtained a resin composition from which the flame retardant component has been removed through dehalogenation, and a resin component reusable as a good recycled material can be recovered with less degradation in quality.

Moreover, by subjecting a flame retardant resin composition not only to dehalogenation but also reduction, it is made possible to restore unsaturated bonds and others resulted from dehalogenation. Furthermore, a resin component which can be utilized as a good recycled material can be recovered with less degradation in quality.

In the case where a thermoplastic resin is used, after the dehalogenation and reduction, a resin composition which was brought into contact with a pressurized fluid is foamed with the use of a solvent constituting the pressurized fluid to assume brittleness, whereby pelletization, powdering, and handling at the time of reuse of the treated resin composition are made easier.

Material recycling of a resin composition which is generally difficult to recycle for the containing a flame retardant is made easier by removing the resin component therefrom.

High permeability of the pressurized fluid realized an even and highly efficient treatment throughout a resin composition.

The use of carbon oxide or water which is a component of the air as the solvent constituting the pressurized fluid makes it possible to recover a recycled resin without drying the solvent after the treatment.

As has been described above, the present invention is of great industrial value.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. A method for treating a flame retardant resin composition, comprising a step of bringing at least part of a flame retardant resin composition containing a resin and a flame retardant into contact with a pressurized fluid comprising of a solvent to reduce flame retardancy of said flame retardant resin composition, wherein said flame retardant is a halogen-containing flame retardant and said flame retardancy is reduced through dehalogenation by bringing at least part of said flame retardant resin composition into contact with said pressurized fluid, wherein the temperature of the pressurized fluid is in a range of 50° C. to 400° C.

2. The method for treating a flame retardant resin composition in accordance with claim 1, further comprising a step of reducing said flame retardant resin composition after said dehalogenation with said solvent constituting said pressurized fluid.

3. The method for treating a flame retardant resin composition in accordance with claim 2, further comprising a step of foaming said flame retardant resin composition after said dehalogenation with said solvent constituting said pressurized fluid.

4. The method for treating a flame retardant resin composition in accordance with 1, claim wherein said solvent is carbon dioxide.

5. The method for treating a flame retardant resin composition in accordance with claim 1, wherein said pressurized fluid has a pressure of not lower than the critical pressure of said solvent constituting said pressurized fluid and not higher than three times said critical pressure.

6. The method for treating a flame retardant resin composition in accordance with claim 1, wherein said pressurized fluid has a pressure of not lower than half the critical pressure of said solvent constituting said pressurized fluid and less than said critical pressure.

* * * * *